United States Patent
Liu (10) Patent No.: US 10,327,147 B2
(45) Date of Patent: Jun. 18, 2019

(54) METHOD AND APPARATUS FOR IDENTIFYING PSEUDO BASE-STATION, AND TERMINAL

(71) Applicant: Guangdong Oppo Mobile Telecommunications Corp., Ltd., Dongguan, Guangdong (CN)

(72) Inventor: Hai Liu, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/801,569

(22) Filed: Nov. 2, 2017

(65) Prior Publication Data

US 2018/0302794 A1  Oct. 18, 2018

(30) Foreign Application Priority Data

Apr. 13, 2017 (CN) .......................... 2017 1 0241142

(51) Int. Cl.
*H04M 1/66* (2006.01)
*H04W 12/12* (2009.01)
(Continued)

(52) U.S. Cl.
CPC ......... *H04W 12/12* (2013.01); *H04L 63/1425* (2013.01); *H04W 12/08* (2013.01);
(Continued)

(58) Field of Classification Search
USPC ............................. 455/410, 433, 458; 1/436
See application file for complete search history.

(56) References Cited

U.S. PATENT DOCUMENTS

2009/0017863 A1   1/2009  Rowley et al.
2009/0047949 A1*  2/2009  Li ..................... H04W 28/08
                                                        455/433
(Continued)

FOREIGN PATENT DOCUMENTS

CN   102513573 A   6/2012
CN   103888965 A   6/2014
(Continued)

OTHER PUBLICATIONS

Xu, De-Ping et al., Brief introduce to CSFB voice solution in LTE system, Telecom Engineering Technics and Standardization, Jan. 15, 2013, No. 1.
(Continued)

*Primary Examiner* — David Q Nguyen
(74) *Attorney, Agent, or Firm* — Young Basile Hanlon & MacFarlane, P.C.

(57) ABSTRACT

Provided are a method and an apparatus for identifying a pseudo base-station, and a terminal and the method includes the follows. A terminal is redirected to a target cell supporting the circuit domain business when receiving a first call request in a first serving cell not supporting circuit domain business. A location area update request is sent to a base-station where the target cell is located when a popularity of LAIs stored do not include a LAI of the target cell. The popularity of LAIs is received from a base-station where the first serving cell is located. The base-station where the target cell is located is identified as a pseudo base-station when a location area update reject information carrying a cause value is received from the base-station where the target cell is located. There is also provided an apparatus for identifying a pseudo base-station and a terminal.

16 Claims, 5 Drawing Sheets

(51) Int. Cl.
  H04W 36/00 (2009.01)
  H04L 29/06 (2006.01)
  H04W 12/08 (2009.01)
  H04W 12/06 (2009.01)
  H04W 48/20 (2009.01)
  H04W 84/04 (2009.01)

(52) U.S. Cl.
  CPC ......... *H04W 36/0022* (2013.01); *H04L 63/10* (2013.01); *H04W 12/06* (2013.01); *H04W 48/20* (2013.01); *H04W 84/045* (2013.01)

(56) References Cited

U.S. PATENT DOCUMENTS

| | | | | |
|---|---|---|---|---|
| 2014/0051443 | A1* | 2/2014 | Diachina | H04W 36/0022 455/436 |
| 2015/0005019 | A1* | 1/2015 | Liu | H04W 4/02 455/458 |
| 2016/0057682 | A1 | 2/2016 | Yang et al. | |
| 2017/0257800 | A1* | 9/2017 | Lee | H04W 36/0022 |
| 2017/0289860 | A1* | 10/2017 | Wang | H04W 36/0022 |

FOREIGN PATENT DOCUMENTS

| | | |
|---|---|---|
| CN | 105873068 A | 8/2016 |
| CN | 105873178 A | 8/2016 |
| CN | 106028331 A | 10/2016 |
| EP | 2003818 A1 | 12/2008 |
| WO | 2016131334 A1 | 8/2016 |
| WO | 2016206610 A1 | 12/2016 |

OTHER PUBLICATIONS

Extended European Search Report issued in corresponding European application No. 17199498.1 dated Dec. 22, 2017.
International Search Report issued in corresponding international application No. PCT/CN2017/107721 dated Jan. 12, 2018.
"Mobile Communication Theory and Practice Popularized Reading Book", China Tietong Telecom, China Railway Publishing House, pp. 65-66, Jun. 30, 2014.
"Pseudo Base Station Capture Tracing Method Research and Application", Fu Xiao-dong, Li Hui-lian, Xiao Hui-qiao, Wu Kai-zhou, Mobile Communications, p. 2, Mar. 30, 2016.

* cited by examiner

METHOD AND APPARATUS FOR IDENTIFYING PSEUDO BASE-STATION, AND TERMINAL

CROSS-REFERENCE TO RELATED APPLICATION

This application claims priority to Chinese Patent Application No. 201710241142.0, filed on Apr. 13, 2017, the content of which is hereby incorporated by reference in its entirety.

TECHNICAL FIELD

The present disclosure relates to the field of communication, and more particularly to a method and an apparatus for identifying a pseudo base-station, and a terminal.

BACKGROUND

With the popularity of mobile phones and other terminals, people become more and more accustomed to performing kinds of life-related operations via the terminals. Generally, the terminals communicate via the operator's base-station. In bustling areas, there may be a pseudo base-station disguised as the operator's base-station. Such pseudo base-station can counterfeit phone number of others to send spam message such as scam message, advertising message and the like to the terminal, therefore, for data security of the terminal, it is necessary to identify the pseudo base-station that interferes with people's lives.

Currently, when the terminal receives a call request in a long term evolution (LTE) cell, as the LTE cell does not support circuit domain business, the terminal is usually redirected to a global system for mobile communication (GSM) cell that supports the circuit domain business. When system information block type 3 (SIB3) message broadcast by a base-station where the GSM cell is located carries some key parameter values, the base-station can be determined as the pseudo base-station.

However, various key parameter values carried by the SIB3 message broadcast by the pseudo base-station are often changed, and thus the accuracy of pseudo base-station identification based on these key parameter values only is low. In addition, the pseudo base-station generally cannot provide resources (such as voice communication resources) that can be provided by the operator's base-station. If the terminal cannot identify the pseudo base-station correctly after receiving a call request, it will cause that the terminal resides in a cell of the pseudo base-station erroneously, thus leading to a call failure.

SUMMARY

Implementations of the present disclosure provide a method and an apparatus for identifying a pseudo base-station, and a terminal, so as to resolve the problem of low accuracy of pseudo base-station identification.

According to a first aspect of the present disclosure, there is provided a method for identifying a pseudo base-station being applicable to a terminal; the method includes the follows.

The terminal is redirected to a target cell supporting circuit domain business when a first call request is received in a first serving cell not supporting the circuit domain business.

A location area update request is sent to a base-station where the target cell is located, when a plurality of location area identities (LAIs) stored do not include a LAI of the target cell. The plurality of LAIs is received from a base-station where the first serving cell is located.

The base-station where the target cell is located is identified as a pseudo base-station when location area update reject information carrying a cause value is received from the base-station where the target cell is located.

According to a second aspect of the present disclosure, there is provided an apparatus for identifying a pseudo base-station being applicable to a terminal; the apparatus includes a first redirecting unit, a sending unit, and an identifying unit.

The first redirecting unit is configured to redirect the terminal to a target cell supporting circuit domain business when a first call request is received in a first serving cell not supporting the circuit domain business.

The sending unit is configured to send a location area update request to a base-station where the target cell is located, when a plurality of LAIs stored do not include a LAI of the target cell. The plurality of LAIs is received from a base-station where the first serving cell is located.

The identifying unit is configured to identify the base-station where the target cell is located as a pseudo base-station when location area update reject information carrying a cause value is received from the base-station where the target cell is located.

According to a third aspect of the present disclosure, there is provided another method for identifying a pseudo base-station being applicable to a terminal; the method includes the follows.

The terminal is redirected to a target cell supporting circuit domain business when a first call request is received in a first serving cell not supporting the circuit domain business.

A location area update request is sent to a base-station where the target cell is located, when a plurality of LAIs stored do not comprise a LAI of the target cell, wherein the plurality of LAIs are received from a base-station where the first serving cell is located.

The base-station where the target cell is located is identified as a pseudo base-station when information responsive to the location area update request received from the base-station where the target cell is located meets a preset condition.

According to a fourth aspect of the present disclosure, there is provided a terminal. The terminal includes at least one processor; a memory storing program codes and the program codes are configured to program the at least one processor to perform the method for identifying a pseudo base-station described according to the first aspect.

According to a fifth aspect of the present disclosure, there is provided a computer-readable storage medium. The computer-readable storage medium is a non-volatile memory. The computer-readable storage medium stores instructions configured to make computers execute the method for identifying a pseudo base-station described according to the first aspect when the instructions are running in the computers.

By means of implementations of the present disclosure, the terminal is redirected to a target cell supporting circuit domain business when a first call request is received in a first serving cell not supporting the circuit domain business. Then, the terminal sends a location area update request to a base-station where the target cell is located, when a plurality of LAIs stored do not include a LAI of the target cell.

Finally, the terminal identifies the base-station where the target cell is located as a pseudo base-station when location area update reject information carrying a cause value is received from the base-station where the target cell is located. By means of implementations of the present disclosure, accuracy of pseudo base-station identification can be improved greatly, so as to prevent the terminal from residing in cells of the pseudo base-station erroneously, thus ensuring that the terminal can be called normally and improving a call completion ratio effectively.

BRIEF DESCRIPTION OF THE DRAWINGS

In order to illustrate the technical solutions of implementations of the present disclosure more clearly, the drawings used in the implementations will be briefly described below. It will be apparent that the drawings described in the following are merely some implementations of the present disclosure, and it will be apparent to those skilled in the art that other drawings can be obtained from the drawings without any creative work.

DETAILED DESCRIPTION

To provide a better understanding of the objects, technical solutions and advantages of the present disclosure, various implementations of the disclosure will be described below in further detail with reference to the accompanying drawings.

Before describing the implementations of the present disclosure in detail, terms used in the implementations of the present disclosure will be explained first.

"Location area (LA)" generally refers to a set of cells in a mobile communication system. The role of setting a LA is to make a mobile switching center (MSC) confirm a location of a terminal in time. When calling the terminal, the MSC only needs to search all cells in the LA of the terminal to find the terminal quickly and accurately.

"Circuit switched domain fall back (CSFB)" generally refers to a process that when the terminal resides in a cell not supporting circuit domain business, voice business and other circuit domain business of the terminal will fall back to a circuit domain to be executed.

An application scenario involved in the implementations of the present disclosure will be explained.

Currently, when the terminal is located in an area covered by a cell not supporting the circuit domain business and a cell supporting the circuit domain business, if the terminal receives a call request in a serving cell not supporting the circuit domain business, the terminal will conduct a CSFB to be redirected to the cell supporting the circuit domain business so that the call request can fall back to the circuit domain to be executed. As a pseudo base-station generally cannot provide resources (such as voice communication resources) that can be provided by operator's base-station, when the terminal is redirected to a cell of the pseudo base-station, it will lead to call failure to the terminal. Therefore, there is provided a method for identifying a pseudo base-station, to identify the pseudo base-station accurately to avoid the call failure caused by the terminal resides in the cell of the pseudo base-station erroneously.

An implementation environment involved in the implementations of the present disclosure will be explained below.

Figure 1:
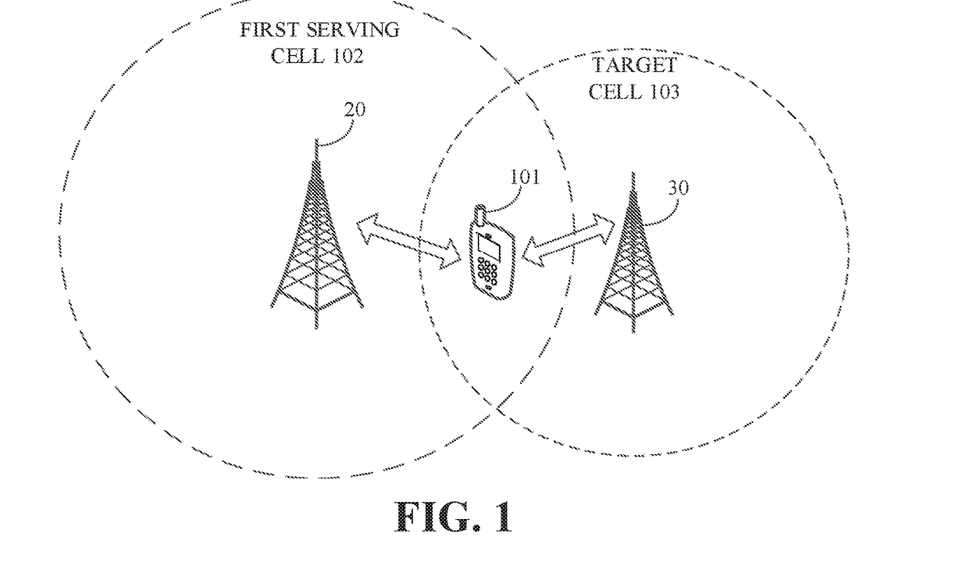
FIG. 1 is a schematic diagram illustrating an implementation environment involved in a method for identifying a pseudo base-station according to an implementation of the present disclosure.

FIG. 1 is a schematic diagram illustrating an implementation environment involved in a method for identifying a pseudo base-station according to an implementation of the present disclosure. As illustrated in FIG. 1, the implementation environment includes a terminal 101, a first serving cell 102, a target cell 103, a base-station 20 where the first serving cell 102 is located, and a base-station 30 where the target cell 103 is located. The terminal 101 is located in an area covered by the first serving cell 102 and the target cell 103. Both the base-station 20 where the first serving cell 102 is located and the base-station 30 where the target cell 103 is located can communicate with the terminal 101 via a wireless connection. The first serving cell 102 is a cell not supporting the circuit domain business, for example, the first serving cell 102 can be an LTE cell and the like. The target cell 103 is a cell supporting the circuit domain business, for example, the target cell 103 can be a GSM cell and the like. After receiving a first call request in the first serving cell 102, the terminal 101 can conduct the CSFB to be redirected to the target cell 103 so that the first call request can fall back to a circuit domain to be executed.

Figure 2:
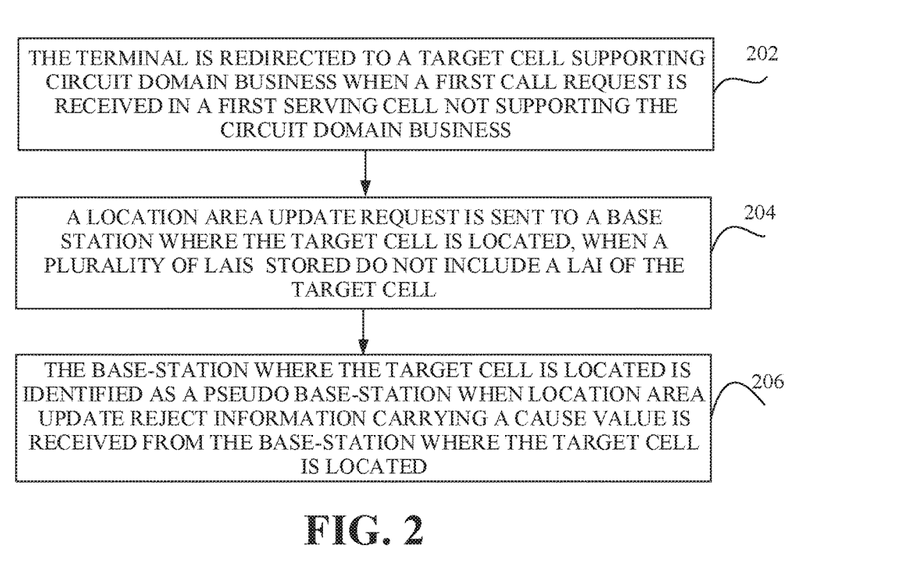
FIG. 2 is a flowchart diagram illustrating a method for identifying a pseudo base-station according to an implementation of the present disclosure.

FIG. 2 is a flowchart illustrating a method for identifying a pseudo base-station according to an implementation of the present disclosure. The method is applicable to a terminal. As illustrated in FIG. 2, the method can begin at block 202.

At block 202, the terminal is redirected to a target cell supporting circuit domain business when a first call request is received in a first serving cell not supporting the circuit domain business.

The first call request is configured to make a call to the terminal. As the first call request belongs to voice business and needs to be executed in the circuit domain, when receiving the first call request in the first serving cell not supporting the circuit domain business, the terminal needs to be redirected to the target cell supporting the circuit domain business by conducting a CSFB, so that the first call request can fall back to the circuit domain to be executed.

What needs to be explained is, the circuit domain business refers to a business that needs to be conducted in the circuit domain, for example, the circuit domain business can be the voice business and the like.

In addition, the first serving cell refers to a cell the terminal currently resides in. For example, the first serving cell can be an LTE cell and the like. The target cell refers to a cell the terminal is redirected to. For example, the target cell can be a GSM cell and the like.

The process that the terminal is redirected to the target cell supporting the circuit domain business can be achieved as follows.

A redirecting list is received from a base-station where the first serving cell is located. The redirecting list includes frequency point information of a plurality of cells supporting the circuit domain business. Target frequency point information is selected from the redirecting list and the terminal is redirected to the target cell having the target frequency point information.

In practice, when the terminal receives a call request in a serving cell not supporting the circuit domain business, a base-station where the serving cell is located will conduct the CSFB. At this point, the base-station where the serving cell is located will send the redirecting list to the terminal by itself, so that the terminal can be redirected to a cell supporting the circuit domain business based on the redirecting list.

In addition, multiple cells that are capable of supporting the circuit domain business as indicated in a redirecting list can be adjacent cells of different systems, and the redirecting list is received from a base-station where some serving cell is located. For example, multiple cells that are capable of supporting the circuit domain business as indicated in the redirecting list received from a base-station where the first serving cell is located can be adjacent cells of different systems of the first serving cell.

What needs to be explained is, redirecting refers to a process of releasing a connection with a base-station where a current resident cell is located and establishing a connection with a base-station where an adjacent cell of a different system is located, when the terminal is in a communication state. For example, the process of redirecting the terminal to the target cell means that the terminal releases a connection with the base-station where the currently resided first serving cell is located and establishes a connection with a base-station where the target cell is located.

In addition, a frequency point is a serial number of a frequency band, and a frequency point of a cell is a serial number of an operating frequency band of a downlink signal received from a base-station where the cell is located. Frequency point information of the cell is configured to indicate the frequency point of the cell.

When the target frequency point information is selected from the redirecting list, one piece of frequency point information can be selected randomly from the redirecting list as the target frequency point information; or the first frequency point information in the redirecting list can be selected as the target frequency point information. Of course, it is also possible to select one piece of frequency point information from the redirecting list as the target frequency point information in other ways and the present disclosure is not limited thereto.

At block 204, a location area update request is sent to a base station where the target cell is located, when a plurality of location area identities (LAIs) stored do not include a LAI of the target cell.

What needs to be explained is, a LAI is configured to identify a LA uniquely. The location area update request is configured to request to update LA information of the terminal.

In addition, the plurality of LAIs is received from the base-station where the first serving cell is located. In practice, the base station where the first serving cell is located will send the plurality of LAIs to the terminal after the terminal resides in the first serving cell. The plurality of LAIs is LAIs of adjacent cells of a different system that have common coverage area with the first serving cell. The plurality of LAIs are stored in a MSC. The MSC can determine a location of the terminal on the basis of the plurality of the LAIs.

When the LAI of the target cell is not included in the plurality of LAIs stored, it indicates that the location of the terminal may have changed and therefore, the terminal needs to send the location area update request to the base station where the target cell is located to conduct a location area update (LAU), as such, the MSC can update the LA information of the terminal and determine a current location of the terminal on the basis of the updated LA information.

At block 206, the base-station where the target cell is located is identified as a pseudo base-station when location area update reject information carrying a cause value is received from the base-station where the target cell is located.

Since the pseudo base-station cannot communicate with the MSC and cannot update the LA information of the terminal, after receiving the location area update request from the terminal, the pseudo base-station can only send a LAU reject information to the terminal to reject the LAU request of the terminal. In addition, the reason that the pseudo base-station rejects the LAU request of the terminal is generally special and is different from the reason that the operator's base station rejects the LAU request of the terminal. Therefore, after sending the LAU request to the base-station where the target cell is located, if the terminal receives the LAU reject message carrying the cause value from the base-station where the target cell is located, the base-station where the target cell is located can be identified as the pseudo base-station.

What needs to be explained is, the cause value can be preset. For example, the cause value can be a first cause value (such as 13) and a second cause value (such as 15), and the like. When the cause value is the first cause value, the cause value may be configured to indicate that national roaming is not allowed in location areas corresponding to the base-station where the target cell is located (NATIONAL_ROAMING_NOT_ALLOWED). When the cause value is the second cause value, the cause value may be configured to indicate that there is no cell matching the terminal supporting the circuit domain business in the location areas corresponding to the base-station where the target cell is located (NO_SUITABLE_CELLS_IN_LA).

Further, after identifying the pseudo base-station accurately, the terminal can further store frequency point information of a cell of the pseudo base-station (that is, frequency point information of the first serving cell and frequency point information of the target cell), such that the cell of the pseudo base-station can be filtered based on the frequency point information of the cell of the pseudo base-station when the terminal is called next time and the terminal can be redirected to a normal cell, therefore ensuring that the terminal can be called normally and improve a call completion ratio effectively.

What needs to be explained is, in this case, the frequency point information of the first serving cell and the frequency point information of the target cell are equivalent to frequency point information of the cell of the pseudo base-station. The terminal can filter the cell of the pseudo base-station based on the frequency point information of the cell of the pseudo base-station.

When storing the frequency point information of the first serving cell and the frequency point information of the target cell correspondingly, the terminal can store the frequency point information of the first serving cell and the frequency point information of the target cell into a correspondence between frequency point information of a resident cell and frequency point information of a redirecting cell and then store the correspondence into its database. Obviously, the terminal can store the frequency point information of the first serving cell and the frequency point information of the target cell correspondingly in other ways and the present disclosure is not limited thereto.

Furthermore, after storing the frequency point information of the first serving cell and the frequency point information of the target cell correspondingly, the terminal can be redirected to a cell supporting the circuit domain business other than the target cell based on the correspondingly stored frequency point information of the first serving cell and frequency point information of the target cell, when a second call request is received in a second serving cell not supporting the circuit domain business, so as to prevent the terminal from residing in the cell of the pseudo base-station erroneously and make sure the terminal can be called normally.

What needs to be explained is, the second serving cell can be an LTE cell and the like. In addition, the second call request is configured to make a call to the terminal.

The process of redirecting the terminal to the cell supporting the circuit domain business other than the target cell based on the frequency point information of the first serving cell and the frequency point information of the target cell stored correspondingly can include the follows.

(1) A redirecting list is received from a base-station where the second serving cell is located.

What needs to be explained is, the redirecting list includes frequency point information of a plurality of cells supporting the circuit domain business, and the plurality of cells supporting the circuit domain business can be adjacent cells of a different system of the second serving cell.

(2) Frequency point information other than the frequency point information of the target cell is selected from the redirecting list, when frequency point information of the second serving cell is the same as the frequency point information of the first serving cell.

When the frequency point information of the second serving cell is the same as the frequency point information of the first serving cell, a cell having the frequency point information of the target cell included in the redirecting list is the cell of the pseudo base-station. At this point, frequency point information other than the frequency point information of the target cell is selected from the redirecting list. That is, the frequency point information of the cell of the pseudo base-station is filtered from the redirecting list so as to make sure that a cell having the frequency point information that the terminal selects is a normal cell, thereby making sure that the terminal can conduct a normal voice business when it is redirected to the cell having the frequency point information selected.

(3) The terminal is redirected to the cell having the frequency point information selected.

As the cell having the frequency point information selected is the normal cell, after the terminal is redirected to the cell having the frequency point information selected, the second call request can fall back to the circuit domain normally to be executed, so as to ensure the terminal can be called normally.

By means of implementations of the present disclosure, the terminal is redirected to the target cell supporting the circuit domain business when the first call request is received in the first serving cell not supporting the circuit domain business. Then the terminal sends the location area update request to a base-station where the target cell is located, when the plurality of LAIs stored do not include the LAI of the target cell. Thereafter, the terminal identifies the base-station where the target cell is located as the pseudo base-station when the location area update reject information carrying the cause value is received from the base-station where the target cell is located. Compared with a solution of identifying a pseudo base-station on the basis of key parameter values carried by the SIB3 message broadcast by a base-station, by means of implementations of the present disclosure, accuracy of pseudo base-station identification can be improved. In addition, after identifying the pseudo base-station accurately, the terminal can further store the frequency point information of the cell of the pseudo base-station, so as to filter the cell of the pseudo base-station based on the frequency point information of the cell of the pseudo base-station when the terminal is called next time, in this way, the terminal can be redirected to the normal cell, thus ensuring that the terminal can be called normally and improving a call completion ratio effectively.

Figure 3:
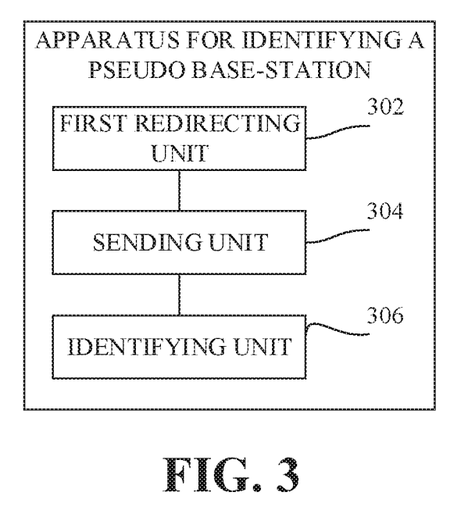
FIG. 3 is a structural schematic diagram illustrating a first apparatus for identifying a pseudo base-station according to an implementation of the present disclosure.
Figure 4:
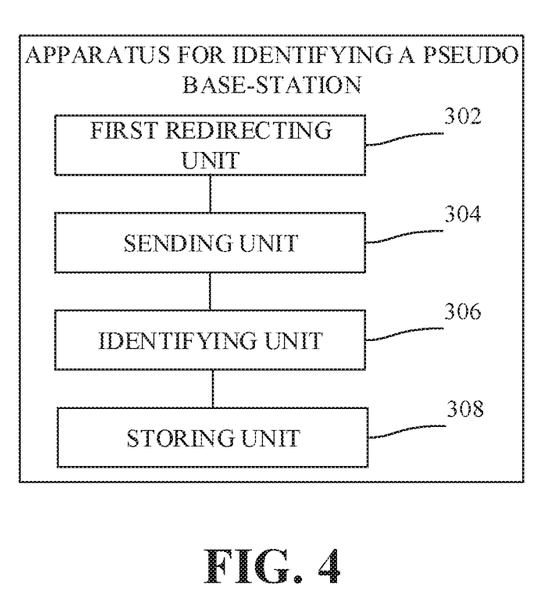
FIG. 4 is a structural schematic diagram illustrating a second apparatus for identifying a pseudo base-station according to an implementation of the present disclosure.
Figure 5:
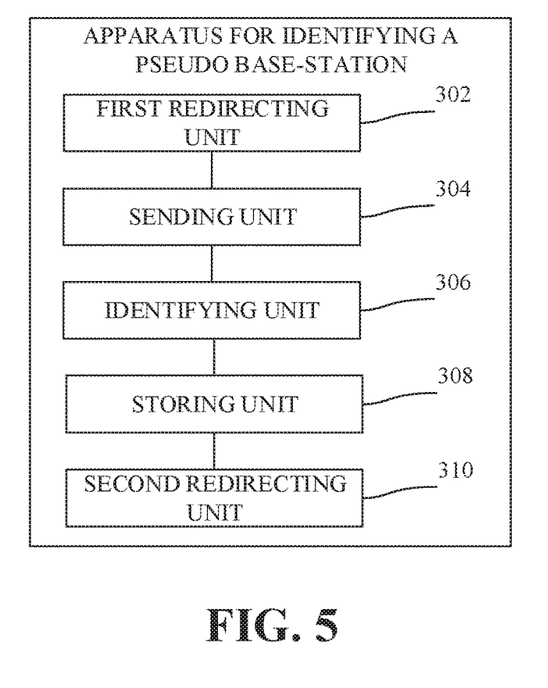
FIG. 5 is a structural schematic diagram illustrating a third apparatus for identifying a pseudo base-station according to an implementation of the present disclosure.

According to an implementation of the present disclosure, there is provided an apparatus for identifying a pseudo base-station, which is applicable to execute the method for identifying a pseudo base-station described in the above implementations of the present disclosure. FIG. 3~FIG. 5 are schematic diagrams illustrating an apparatus for identifying a pseudo base-station according to implementations of the present disclosure.

FIG. 3 is a structural schematic diagram illustrating an apparatus for identifying a pseudo base-station according to an implementation of the present disclosure. The apparatus can be applicable to a terminal. As illustrated in FIG. 3, the apparatus can include a first redirecting unit 302 (such as a logic circuit, controller), a sending unit 304 (such as a logic circuit, transmitter, antenna), and an identifying unit 306 (such as a processor or a device embodied in the processor).

The first redirecting unit 302 is configured to redirect the terminal to a target cell supporting circuit domain business when a first call request is received in a first serving cell not supporting the circuit domain business.

The sending unit 304 is configured to send a location area update request to a base-station where the target cell is located, when a plurality of location area identities (LAIs) stored do not include a LAI of the target cell. The plurality of LAIs is received from a base-station where the first serving cell is located.

The identifying unit 306 is configured to identify the base-station where the target cell is located as a pseudo base-station when location area update reject information carrying a cause value is received from the base-station where the target cell is located.

In some possible implementations, the first redirecting unit 302 is further configured to receive a redirecting list from the base-station where the first serving cell is located, select target frequency point information from the redirecting list, and redirect the terminal to the target cell having the target frequency point information. The redirecting list includes frequency point information of a plurality of cells supporting the circuit domain business.

In some possible implementations, the cause value includes a first cause value and a second cause value, the first cause value is configured to indicate that national roaming is not allowed in location areas corresponding to the base-station where the target cell is located, and the second cause value is configured to indicate that there is no cell matching the terminal supporting the circuit domain business in the location areas corresponding to the base-station where the target cell is located.

FIG. 4 is a structural schematic diagram illustrating a second apparatus for identifying a pseudo base-station of an implementation of the present disclosure. The apparatus for identifying a pseudo base-station illustrated in FIG. 4 is obtained on the basis of the apparatus for identifying a pseudo base-station illustrated in FIG. 3. Compared with the apparatus for identifying a pseudo base-station illustrated in FIG. 3, the apparatus for identifying a pseudo base-station illustrated in FIG. 4 can further include a storing unit 308 (such as a memory) in addition to the components of the apparatus for identifying a pseudo base-station illustrated in FIG. 3.

The storing unit 308 is configured to store frequency point information of the first serving cell and frequency point information of the target cell correspondingly.

In some possible implementations, the storing unit 308 is further configured to store the frequency point information of the first serving cell and the frequency point information of the target cell into a correspondence between frequency point information of a resident cell and frequency point information of a redirecting cell, and store the correspondence into a database of the terminal.

FIG. 5 is a structural schematic diagram illustrating a third apparatus for identifying a pseudo base-station of an implementation of the present disclosure. The apparatus for identifying a pseudo base-station illustrated in FIG. 5 is obtained on the basis of the apparatus for identifying a pseudo base-station illustrated in FIG. 4. Compared with the apparatus for identifying a pseudo base-station illustrated in FIG. 4, the apparatus for identifying a pseudo base-station illustrated in FIG. 5 can include a second redirecting unit 310 (such as a logical circuit, controller) in addition to all units of the apparatus for identifying a pseudo base-station illustrated in FIG. 4.

The second redirecting unit 310 is configured to redirect the terminal to a cell supporting the circuit domain business other than the target cell based on the frequency point information of the first serving cell and the frequency point information of the target cell which are stored correspondingly, when a second call request is received in a second serving cell not supporting the circuit domain business.

Figure 6:
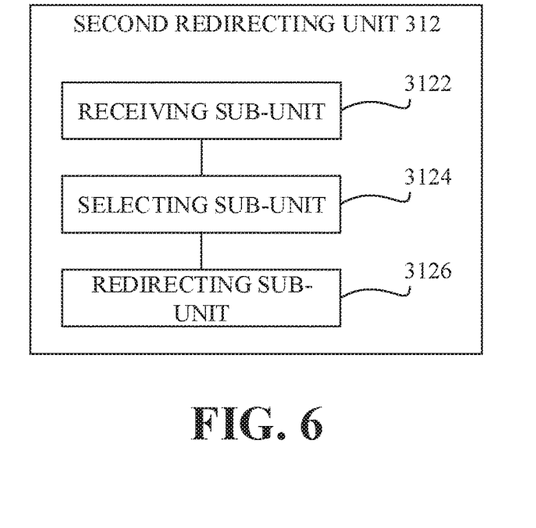
FIG. 6 is a structural schematic diagram illustrating a second redirecting unit according to an implementation of the present disclosure.

In some possible implementations, FIG. 6 is a structural schematic diagram illustrating a second redirecting unit 310 according to an implementation of the present disclosure. As illustrated in FIG. 6, the second redirecting unit 310 can further include a receiving sub-unit 3102 (such as a logical circuit), a selecting sub-unit 3104 (such as a logical circuit, a processor, or a device embodied in the processor), and a redirecting sub-unit 3106 (such as a logical circuit, controller).

The receiving sub-unit 3102 is configured to receive a redirecting list from a base-station where the second serving cell is located. The redirecting list includes frequency point information of a plurality of cells supporting the circuit domain business.

The selecting sub-unit 3104 is configured to select frequency point information other than the frequency point information of the target cell from the redirecting list, when frequency point information of the second serving cell is the same as the frequency point information of the first serving cell.

The redirecting sub-unit 3106 is configured to redirect the terminal to a cell having the frequency point information selected.

By means of implementations of the present disclosure, the terminal is redirected to the target cell supporting the circuit domain business when the first call request is received in the first serving cell not supporting the circuit domain business. Then, the terminal sends the location area update request to a base-station where the target cell is located, when the plurality of LAIs stored do not include a LAI of the target cell. Thereafter, the terminal identifies the base-station where the target cell is located as the pseudo base-station when the location area update reject information carrying a cause value is received from the base-station where the target cell is located. Compared with a solution of identifying a pseudo base-station on the basis of key parameter values carried by the SIB3 message broadcast by a base-station, by means of implementations of the present disclosure, accuracy of pseudo base-station identification can be improved greatly, so as to prevent the terminal from residing in a cell of the pseudo base-station erroneously, therefore ensuring that the terminal can be called normally, and improving a call completion ratio effectively.

What to be explained is, when the apparatus for identifying a pseudo base-station provided in implementations is identifying the pseudo base-station, it is only illustrated divisions of each above-mentioned functional unit. In practice, above-mentioned functions can be assigned to different functional units as needed, that is, an internal structure of the apparatus can be divided into different functional units to accomplish a part or all of functions described above. In addition, the apparatus for identifying a pseudo base-station provided in the above-mentioned implementations has the same conception with the method for identifying a pseudo base-station, the specific implementation process can be referred to the method implementations, and it will not be repeated herein.

What to be explained is, the apparatus for identifying a pseudo base-station described in the implementations of the present disclosure is presented in the form of functional units. Term "unit" used herein should be understood as the widest possible meaning, and objects for implementing a described function of each "unit" may be, for example, an application specific integrated circuit (ASIC), a single circuit, a processor (shared, dedicated, or chip group) for executing one or more software or firmware programs, a memory, a combined logic circuit, and/or other proper assemblies for implementing the abovementioned function.

Figure 7:
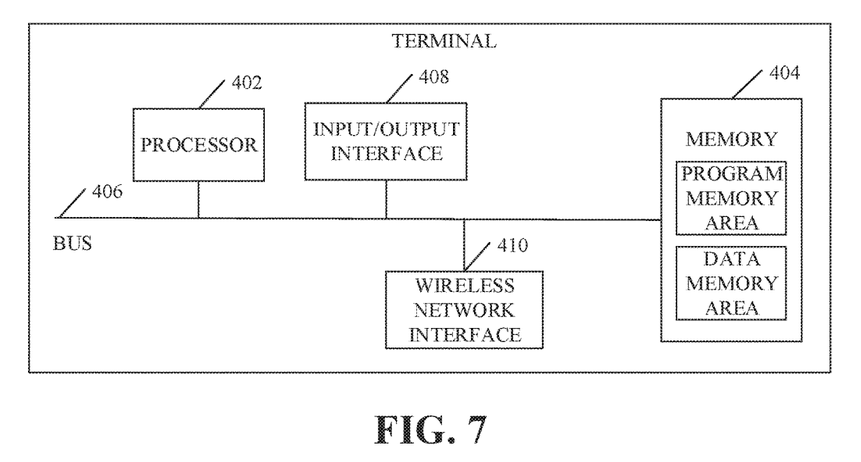
FIG. 7 is a structural schematic diagram illustrating a terminal according to an implementation of the present disclosure.

FIG. 7 is a structural schematic diagram illustrating a terminal according to an implementation of the present disclosure. The apparatus for identifying a pseudo base-station includes a processor 402, a memory 404 and program codes stored in the memory 404. The processor 402 is connected with the memory 404 via a BUS 406. The memory 404 can be a high-speed RAM or a non-volatile memory, such as at least one disk memories. In some possible implementations, the memory 404 can further be at least one storing devices depart from the processor 402. The processor 402 is configured to call application programs stored in the memory 404 to conduct the following operations. Besides, the user terminal can further include an input/output interface 408 for communication with external equipment and a wireless network interface 410 for accessing a network. The processor 402, the memory 404, the input/output interface 408, and the wireless network interface 410 can be interconnected via the BUS 406.

The processor 402 is configured to redirect the terminal to a target cell supporting circuit domain business when a first call request is received in a first serving cell not supporting the circuit domain business.

The processor 402 is configured to send a location area update request to a base-station where the target cell is located, when a plurality of location area identities (LAIs)

stored do not include a LAI of the target cell. The plurality of LAIs is received from a base-station where the first serving cell is located.

The processor 402 is configured to identify the base-station where the target cell is located as a pseudo base-station, when location area update reject information carrying a cause value is received from the base-station where the target cell is located.

In some possible implementations, the processor 402 configured to redirect the terminal to the target cell supporting the circuit domain business is further configured to: receive a redirecting list from the base-station where the first serving cell is located, select target frequency point information from the redirecting list, and redirect the terminal to the target cell having the target frequency point information. The redirecting list includes frequency point information of a plurality of cells supporting the circuit domain business.

In some possible implementations, the cause value includes a first cause value and a second cause value, the first cause value is configured to indicate that national roaming is not allowed in location areas corresponding to the base-station where the target cell is located, and the second cause value is configured to indicate that there is no cell matching the terminal supporting the circuit domain business in the location areas corresponding to the base-station where the target cell is located.

In some possible implementations, the processor 402 that has identified the base-station where the target cell is located as the pseudo base-station is further configured to store frequency point information of the first serving cell and frequency point information of the target cell correspondingly.

In some possible implementations, the processor 402 configured to store the frequency point information of the first serving cell and the frequency point information of the target cell correspondingly is further configured to store the frequency point information of the first serving cell and the frequency point information of the target cell into a correspondence between frequency point information of a resident cell and frequency point information of a redirecting cell and store the correspondence into a database of the terminal.

In some possible implementations, the processor 402 that has stored the frequency point information of the first serving cell and the frequency point information of the target cell correspondingly is further configured to redirect the terminal to a cell supporting the circuit domain business other than the target cell based on the frequency point information of the first serving cell and the frequency point information of the target cell which are stored correspondingly, when a second call request is received in a second serving cell not supporting the circuit domain business.

In some possible implementations, the processor 402, configured to redirect the terminal to the cell supporting the circuit domain business other than the target cell based on the frequency point information of the first serving cell and the frequency point information of the target cell which are stored correspondingly, is further configured to receive a redirecting list from a base-station where the second serving cell is located. The redirecting list includes frequency point information of a plurality of cells supporting the circuit domain business.

The processor 402, configured to redirect the terminal to the cell supporting the circuit domain business other than the target cell based on the frequency point information of the first serving cell and the frequency point information of the target cell which are stored correspondingly, is further configured to select frequency point information other than the frequency point information of the target cell from the redirecting list, when frequency point information of the second serving cell is the same as the frequency point information of the first serving cell, and redirect the terminal to a cell having the frequency point information selected.

Figure 8:
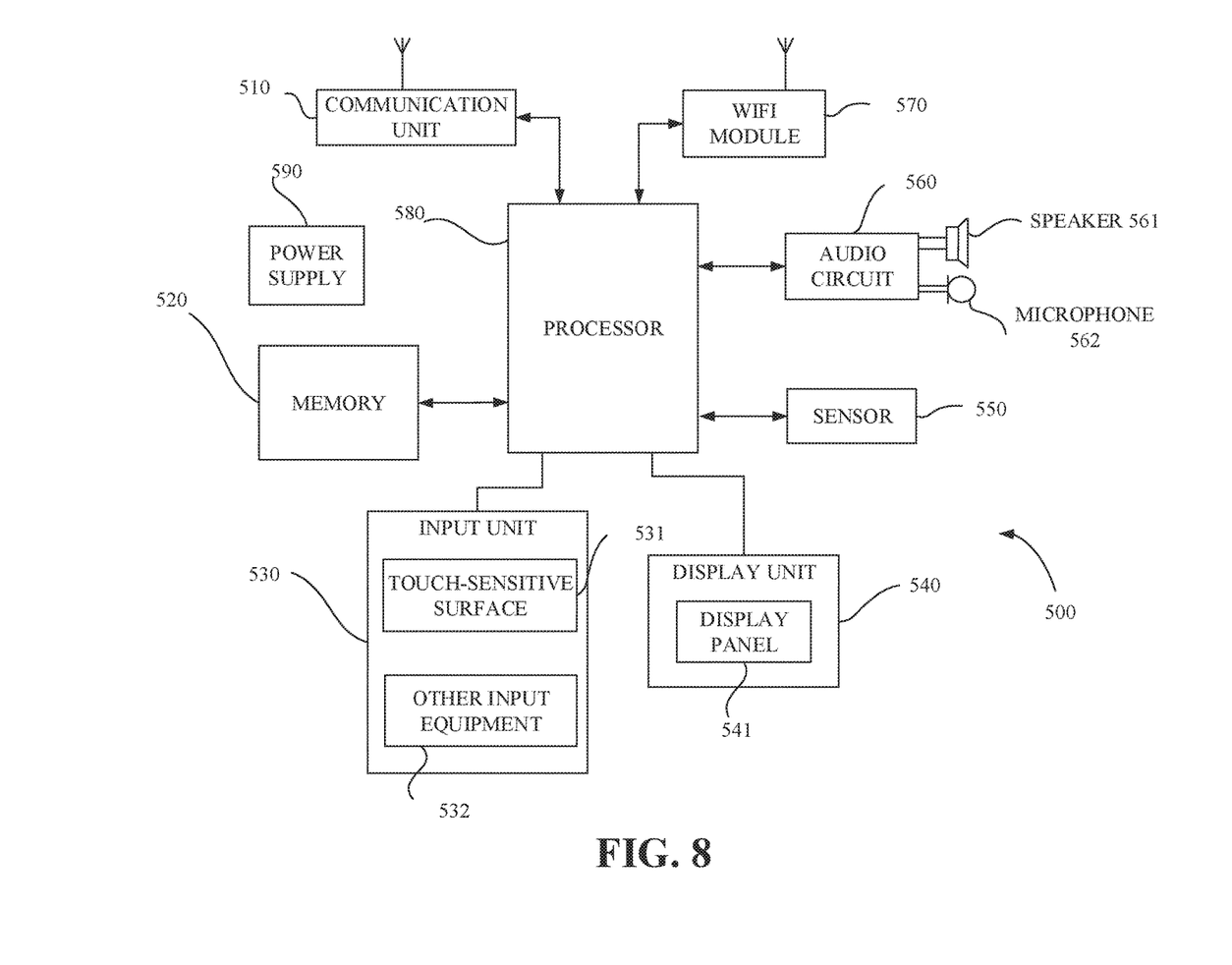
FIG. 8 is a structural schematic diagram illustrating a fourth apparatus for identifying a pseudo base-station according to an implementation of the present disclosure.

FIG. 8 is a structural schematic diagram illustrating a fourth apparatus for identifying a pseudo base-station according to an implementation of the present disclosure. The apparatus for identifying a pseudo base-station can be a terminal 500. As illustrated in FIG. 8, the terminal 500 can include a communication unit 510, a memory 520 including one or more computer-readable storage medium, an input unit 530, a display unit 540, a sensor 550, an audio circuit 560, a wireless fidelity (Wi-Fi) module 570, a processor 580 including one or more processing cores, a power supply 590, and other components. Those skilled in the art may understand that the structure of the apparatus for identifying a pseudo base-station illustrated in FIG. 8 is not intended to limit the terminal, and the terminal may include more or fewer components than those illustrated in the figure, or combine some components, or have different component arrangements.

The communication unit 510 may be configured to receive and transmit a signal during the process of sending or receiving information, or calling. The communication unit 510 can be a radio frequency (RF) circuit, a router, a modem and other network communication devices. In some possible implementations, when the communication unit 510 is an RF circuit, after receiving downlink information from a base-station, the communication unit 510 passes the downlink information to one or more processors 580 for processing and sends data related to uplink the base-station. Usually, the RF circuit regarded as the communication unit 510 includes, but is not limited to, an antenna, at least one amplifier, a tuner, one or more oscillators, a subscriber identity module (SIM) card, a transceiver, a coupler, a low noise amplifier (LNA), a duplexer and so on. In addition, the communication unit 510 may further communicate with other devices via wireless communication and a network. The wireless communication may use any one communication standard or protocol, including, but not limited to, global system of mobile communication (GSM), general packet radio service (GPRS), code division multiple access (CDMA), wideband code division multiple access (WCDMA), long term evolution (LTE), E-mail, short messaging service (SMS) and so on.

The memory 520 may be configured to store software programs and modules, and the processor 580 executes various function applications and data processing by running the software programs and the modules stored in the memory 520. The memory 520 may mainly include a program storage region and a data storage region, the program storage region may store an operating system, application programs needed for at least one function (a sound playing function and a picture playing function) and so on; and the data storage region may store data (such as audio data, a phone book and so on) created according to use of the terminal 500. In addition, the memory 520 may include a high-speed RAM, and may further include a non-volatile memory such as one of at least a disk storage device, a flash device, or other non-volatile solid storage devices. The memory 520 can further include a memory controller, configured to provide a visit to the memory 520 for the processor 580 and the input unit 530.

The input unit 530 may be configured to receive input digital or character information and generate keyboard, mouse, lever, optics, and trackball signal input associated with user setting and functional control. In some possible implementations, the input unit 530 may include a c 531 and other input devices 532. The touch-sensitive surface 531, also referred to a touch display screen or a touch pad, can collect a touch operation of the user on or near the touch-sensitive surface 531 (such as an operation of user on or near the touch-sensitive surface 531 with fingers, stylus and any other suitable objects or attachments) and drive a corresponding connection apparatus based on a pre-set form. In some possible implementations, the touch-sensitive surface 531 can include two parts: a touch detecting apparatus and a touch controller. The touch detecting apparatus can detect a touch orientation of the user, detect a signal brought by the touch operation, and send the signal to the touch controller. The touch controller receives touch information from the touch detecting apparatus, converts the touch information into a touch coordinate, sends the touch information to the processor 580, and receives an order from the processor 580 to conduct it. In addition, the touch-sensitive surface 531 can be implemented by resistance-type, capacitance-type, infra-red ray, surface acoustic wave (SAW) and other types. The input unit 530 may further include, in addition to the touch-sensitive surface 531, other input devices 532. The other input devices 532 may include, but are not limited to, one or more of a physical keyboard, a functional key (such as a volume control key and a switch key), a trackball, a mouse, and an operating rod.

The display unit 540 may be configured to display information input by the user or information provided to the user or various graphical user interfaces of the terminal 500. The graphical user interfaces can consist of figures, texts, icons, videos and any combination thereof. The display unit 540 may include a display panel 541, and in some possible implementations, the display panel 541 may be configured in the form of a liquid crystal display (LCD), an organic light-emitting diode (OLED) and so on. In some possible implementations, the touch-sensitive surface 531 can cover the display panel 541. After the touch-sensitive surface 531 detects the touch operation on or near the touch-sensitive surface 531 and sends the touch operation to the processor 580 to determine a type of a touch event, the processor 580 provides an associated visual output on the display panel 541 based on the type of the touch event. In FIG. 8, although the touch-sensitive surface 531 and the display panel 541 implement input and output functions by serving as two independent components, the touch-sensitive surface 531 may be integrated with the display panel 541 to implement the input and output functions in some possible implementations.

The terminal 500 may further include at least one sensor 550 such as an opto-sensor, a motion sensor, and other sensors. Specifically, the light sensor may include an ambient light sensor and a proximity sensor; the ambient light sensor may adjust the luminance of the display panel 541 according to the brightness of ambient light, and the proximity sensor may close the display panel 541 and/or backlight when the terminal 500 reaches the ear nearby. As a kind of motion sensor, a gravity accelerometer sensor may detect the magnitude of an accelerated speed in each direction (generally, three-axis); when stationary, the accelerometer sensor can detect the size and direction of a gravity; the accelerometer sensor may be configured to identify an application of a mobile phone gesture (e.g., horizontal and vertical screen switching, relevant games, and magnetometer gesture calibration), and vibration recognition related functions (e.g., pedometer and knocking), and the like. Other sensors such as a gyroscope sensor, a barometer sensor, a hygrometer sensor, a thermometer sensor, an infrared sensor, and other sensors configurable for the terminal 500 will not be detailed herein.

The audio circuit 560, a speaker 561, and a microphone 562 may provide an audio interface between the user and the terminal 500. The audio circuit 560 may convert received audio data to an electric signal, and transmit the electric signal to the speaker 561, and the speaker 561 converts the electric signal into a sound signal for output. Besides, the microphone 562 converts a collected sound signal into an electric signal, the audio circuit 560 receives and converts the electric signal into audio data; the audio data is output to the processor 580 for processing and the processed audio data is transmitted to another terminal via the communication unit 510, or the audio data is output to the memory 520 for further processing. The audio circuit 560 may further include an earplug jack configured to provide a communication between earphones and the terminal 500.

In order to achieve wireless communication, the terminal 500 may be configured with a wireless communication unit 570, and the wireless communication unit 570 can be a Wi-Fi module. Wi-Fi belongs to a short-range wireless transmission technology, the terminal 500 may assist the user in E-mail receiving and sending, webpage browsing, access to streaming media and the like by means of the wireless communication unit 570, and it provides a wireless wideband internet access for the user. Although the wireless communication unit 570 is illustrated in FIG. 8, it may be understood that wireless communication unit 570 does not belong to necessary components of the terminal 500 and can totally be omitted without changing the essence of the present disclosure as required.

The processor 580 is a control center of the terminal 500, and is configured to connect all parts of the whole mobile phone by utilizing various interfaces and lines, to run or execute the software programs and/or the modules stored in the memory 520 and call data stored in the memory 520 to execute various functions and processing data of the terminal 500, so as to wholly monitor the mobile phone. In some implementations, the processor 580 may include one or more processing cores. In some possible implementations, the processor 580 may be integrated with an application processor and a modulation-demodulation processor, the application processor mainly processes an operation system, a user interface, an application program and the like, and the modulation-demodulation processor mainly processes wireless communication. It should be understood that the modulation-demodulation processor may not be integrated into the processor 580.

The terminal 500 may further include a power supply 590 (such as a battery) for supplying power to each component. The power supply 590 may be connected with the processor 580 logically via a power supply management system, so as to implement functions of charging, discharging, and power consumption management by means of the power supply management system. The power supply 590 can include one or more direct current (DC) or alternating current (AC) power supplies, a recharging system, a power supply failure detecting circuit, a power converter or an inverter, a power status indicator and any other components.

The terminal 500 may further include a camera, a Bluetooth module and the like, which are not illustrated, and will not be detailed herein.

In the implementations of the present disclosure, the terminal may further include one or more programs, which are stored in the memory and configured to be executed by one or more processors. The one or more programs may include instructions configured to execute the method for identifying a pseudo base-station provided in the implementation as illustrated in FIG. 2.

Those of ordinary skilled in the art should know that: all or a part of the steps of the above-mentioned method implementations may be implemented by instructing related hardware through a program, the above-mentioned program may be stored in a computer-readable memory; and the memory may include: a flash disk, a ROM, a RAM, a magnetic disk or an optical disk.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for identifying a pseudo base-station, being applicable to a terminal, the method comprising:
   redirecting the terminal to a target cell supporting circuit domain business when a first call request is received in a first serving cell not supporting the circuit domain business;
   sending a location area update request to a base-station where the target cell is located, when a plurality of location area identities (LAIs) stored do not comprise a LAI of the target cell, wherein the plurality of LAIs are received from a base-station where the first serving cell is located;
   identifying the base-station where the target cell is located as the pseudo base-station when location area update reject information carrying a cause value is received from the base-station where the target cell is located, wherein the cause value comprises a first cause value and a second cause value, wherein the first cause value is configured to indicate that national roaming is not allowed in location areas corresponding to the base-station where the target cell is located, wherein the second cause value is configured to indicate that there is no cell matching the terminal supporting the circuit domain business in the location areas corresponding to the base-station where the target cell is located;
   storing frequency point information of the first serving cell and frequency point information of the target cell correspondingly; and
   redirecting the terminal to a cell supporting the circuit domain business other than the target cell based on the frequency point information of the first serving cell and the frequency point information of the target cell which are stored correspondingly, when a second call request is received in a second serving cell not supporting the circuit domain business.

2. The method of claim 1, wherein the first serving cell is a long term evolution (LTE) cell and the target cell is a global system for mobile communication (GSM) cell.

3. The method of claim 1, wherein redirecting the terminal to the target cell supporting the circuit domain business comprises:
   receiving a redirecting list from the base-station where the first serving cell is located, wherein the redirecting list comprises frequency point information of a plurality of cells supporting the circuit domain business; and
   selecting target frequency point information from the redirecting list and redirecting the terminal to the target cell having the target frequency point information.

4. The method of claim 1, wherein storing the frequency point information of the first serving cell and the frequency point information of the target cell correspondingly comprises:
   storing the frequency point information of the first serving cell and the frequency point information of the target cell into a correspondence between frequency point information of a resident cell and frequency point information of a redirecting cell; and
   storing the correspondence into a database of the terminal.

5. The method of claim 1, wherein redirecting the terminal to the cell supporting the circuit domain business other than the target cell based on the frequency point information of the first serving cell and the frequency point information of the target cell which are stored correspondingly comprises:
   receiving a redirecting list from a base-station where the second serving cell is located, wherein the redirecting list comprises frequency point information of a plurality of cells supporting the circuit domain business;
   selecting frequency point information other than the frequency point information of the target cell from the redirecting list, when frequency point information of the second serving cell is the same as the frequency point information of the first serving cell; and
   redirecting the terminal to a cell having the frequency point information selected.

6. The method of claim 3, wherein the plurality of cells supporting the circuit domain business as indicated in the redirecting list received from the base-station where the first serving cell is located are adjacent cells of different systems of the first serving cell.

7. The method of claim 3, wherein the selecting target frequency point information from the redirecting list comprises one of:
   selecting one piece of frequency point information randomly from the redirecting list as the target frequency point information; or
   selecting the first frequency point information in the redirecting list as the target frequency point information.

8. An apparatus for identifying a pseudo base-station, being applicable to a terminal, the apparatus comprising:
   at least one processor; and
   a computer readable storage coupled to the at least one processor and storing at least one computer executable instruction thereon, which when executed by the at least one processor, cause the at least one process to carry out actions comprising:
   redirecting the terminal to a target cell supporting circuit domain business when a first call request is received in a first serving cell not supporting the circuit domain business;
   sending a location area update request to a base-station where the target cell is located, when a plurality of location area identities (LAIs) stored do not comprise a LAI of the target cell, wherein the plurality of LAIs are received from a base-station where the first serving cell is located;
   identifying the base-station where the target cell is located as the pseudo base-station when location area update reject information carrying a cause value is received from the base-station where the target cell is located, wherein the cause value comprises a first cause value and a second cause value, wherein the first cause value is configured to indicate that national roaming is not allowed in location areas corresponding to the base-station where the target cell is located, wherein the second cause value is configured to indicate that there is no cell matching the terminal supporting the circuit domain business in the location areas corresponding to the base-station where the target cell is located;

storing frequency point information of the first serving cell and frequency point information of the target cell correspondingly; and redirecting the terminal to a cell supporting the circuit domain business other than the target cell based on the frequency point information of the first serving cell and the frequency point information of the target cell which are stored correspondingly, when a second call request is received in a second serving cell not supporting the circuit domain business.

9. The apparatus of claim 8, wherein the first serving cell is a long term evolution (LTE) cell and the target cell is a global system for mobile communication (GSM) cell.

10. The apparatus of claim 8, wherein the at least one processor carrying out the action of redirecting the terminal to the target cell supporting the circuit domain business when the first call request is received in the first serving cell not supporting the circuit domain business is further caused to carry out actions comprising:

receiving a redirecting list from the base-station where the first serving cell is located, wherein the redirecting list comprises frequency point information of a plurality of cells supporting the circuit domain business; and selecting target frequency point information from the redirecting list and redirect the terminal to the target cell having the target frequency point information.

11. The apparatus of claim 8, wherein the at least one processor carrying out the action of storing the frequency point information of the first serving cell and the frequency point information of the target cell correspondingly is further caused to carry out actions comprising:

storing the frequency point information of the first serving cell and the frequency point information of the target cell into a correspondence between frequency point information of a resident cell and frequency point information of a redirecting cell; and storing the correspondence into a database of the terminal.

12. The apparatus of claim 8, wherein the at least one processor carrying out the action of redirecting the terminal to the cell supporting the circuit domain business other than the target cell is further caused to carry out actions comprising:

receiving a redirecting list from a base-station where the second serving cell is located, wherein the redirecting list comprises frequency point information of a plurality of cells supporting the circuit domain business;

selecting frequency point information other than the frequency point information of the target cell from the redirecting list, when frequency point information of the second serving cell is the same as the frequency point information of the first serving cell; and redirecting the terminal to a cell having the frequency point information selected.

13. A non-transitory computer-readable storage medium storing a computer program which, when executed by a processor, causes the processor to carry out actions:

redirecting a terminal to a target cell supporting circuit domain business when a first call request is received in a first serving cell not supporting the circuit domain business;

sending a location area update request to a base-station where the target cell is located, when a plurality of location area identities (LAIs) stored do not comprise a LAI of the target cell, wherein the plurality of LAIs are received from a base-station where the first serving cell is located;

identifying the base-station where the target cell is located as a pseudo base-station when information responsive to the location area update request received from the base-station where the target cell is located meets a preset condition, wherein the cause value comprises a first cause value and a second cause value, wherein the first cause value is configured to indicate that national roaming is not allowed in location areas corresponding to the base-station where the target cell is located, wherein the second cause value is configured to indicate that there is no cell matching the terminal supporting the circuit domain business in the location areas corresponding to the base-station where the target cell is located;

storing frequency point information of the first serving cell and frequency point information of the target cell correspondingly; and redirecting the terminal to a cell supporting the circuit domain business other than the target cell based on the frequency point information of the first serving cell and the frequency point information of the target cell which are stored correspondingly, when a second call request is received in a second serving cell not supporting the circuit domain business.

14. The non-transitory computer readable storage medium of claim 13, wherein the computer program executed by the processor to carry out the action of redirecting the terminal to the target cell supporting the circuit domain business is executed by the processor to carry out actions, comprising:

receiving a redirecting list from the base-station where the first serving cell is located, wherein the redirecting list comprises frequency point information of a plurality of cells supporting the circuit domain business; and selecting target frequency point information from the redirecting list and redirecting the terminal to the target cell having the target frequency point information.

15. The non-transitory computer readable storage medium of claim 14, wherein the computer program executed by the processor to carry out the action of selecting the target frequency point information from the redirecting list is executed by the processor to carry out actions, comprising:

selecting one piece of frequency point information randomly from the redirecting list as the target frequency point information.

16. The non-transitory computer readable storage medium of claim 14, wherein the computer program executed by the processor to carry out the action of selecting the target frequency point information from the redirecting list is executed by the processor to carry out actions, comprising:

selecting first frequency point information in the redirecting list as the target frequency point information.

* * * * *